United States Patent
Turner et al.

(10) Patent No.: US 10,644,951 B2
(45) Date of Patent: May 5, 2020

(54) ADDING METADATA ASSOCIATED WITH A COMPOSITE NETWORK POLICY

(71) Applicant: Hewlett Packard Enterprise Development LP, Houston, TX (US)

(72) Inventors: Yoshio Turner, San Francisco, CA (US); Jeongkeun Lee, Mountain View, CA (US); Charles F. Clark, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 170 days.

(21) Appl. No.: 15/746,002

(22) PCT Filed: Jul. 22, 2015

(86) PCT No.: PCT/US2015/041547
§ 371 (c)(1),
(2) Date: Jan. 19, 2018

(87) PCT Pub. No.: WO2017/014770
PCT Pub. Date: Jan. 26, 2017

(65) Prior Publication Data
US 2018/0227185 A1    Aug. 9, 2018

(51) Int. Cl.
*H04L 29/06* (2006.01)
*H04L 12/24* (2006.01)
*H04L 29/08* (2006.01)

(52) U.S. Cl.
CPC ...... *H04L 41/0893* (2013.01); *H04L 63/0263* (2013.01); *H04L 63/104* (2013.01); *H04L 63/20* (2013.01); *H04L 67/2804* (2013.01)

(58) Field of Classification Search
CPC .................................................. H04L 41/0893
See application file for complete search history.

(56) References Cited

U.S. PATENT DOCUMENTS 6,151,624 A * 11/2000 Teare ................ H04L 29/12009
709/217
6,393,473 B1    5/2002 Chu
(Continued)

FOREIGN PATENT DOCUMENTS

CN    101833497 A    9/2010
WO    2016/072996 A1    5/2016

OTHER PUBLICATIONS

Atarashi, Ray S., Junichi Kishigami, and Shigeo Sugimoto. "Metadata and new challenges." 2003 Symposium on Applications and the Internet Workshops, 2003. Proceedings . . . IEEE, 2003. (Year: 2003).*

(Continued)

*Primary Examiner* — Shawnchoy Rahman
(74) *Attorney, Agent, or Firm* — Hewlett Packard Enterprise Patent Department

(57) ABSTRACT

In some examples, input network policies are combined to form a composite network policy, each input network policy of the input network policies specifying at least one characteristic of communications allowed between endpoint groups in a network. Metadata associated with the composite network policy is added, the metadata including information regarding a reason for disallowance of a communication between endpoint groups.

13 Claims, 5 Drawing Sheets

(56) References Cited

U.S. PATENT DOCUMENTS

| | | | |
|---|---|---|---|
| 7,707,619 | B2 | 4/2010 | Shelest et al. |
| 7,761,708 | B2 | 7/2010 | Swander et al. |
| 7,941,309 | B2 | 5/2011 | Dublish et al. |
| 8,443,433 | B2 | 5/2013 | Abzarian et al. |
| 8,447,722 | B1 | 5/2013 | Ahuja et al. |
| 8,479,257 | B1 | 7/2013 | Lloyd |
| 8,693,344 | B1 * | 4/2014 | Adams ................ H04L 41/0893 370/241 |
| 8,938,783 | B2 | 1/2015 | Becker et al. |
| 9,420,002 | B1 * | 8/2016 | McGovern .............. H04L 63/10 |
| 2007/0016822 | A1 | 1/2007 | Rao et al. |
| 2008/0133978 | A1 | 6/2008 | Angamuthu et al. |
| 2008/0161941 | A1 | 7/2008 | Strassner et al. |
| 2008/0205377 | A1 | 8/2008 | Chao et al. |
| 2011/0125894 | A1 | 5/2011 | Anderson et al. |
| 2012/0023546 | A1 | 1/2012 | Kartha et al. |
| 2012/0240183 | A1 | 9/2012 | Amit |
| 2013/0019280 | A1 | 1/2013 | Larson et al. |
| 2013/0019282 | A1 | 1/2013 | Rice et al. |
| 2013/0124567 | A1 | 5/2013 | Balinsky et al. |
| 2014/0250489 | A1 | 9/2014 | Calo et al. |
| 2015/0082370 | A1 | 3/2015 | Jayaraman et al. |
| 2015/0095895 | A1 | 4/2015 | Taneja et al. |
| 2015/0134801 | A1 | 5/2015 | Walley et al. |
| 2015/0172412 | A1 | 6/2015 | Escriva et al. |

OTHER PUBLICATIONS

Partial European Search Report and Search Opinion Received for EP Application No. 15899083.8, dated Dec. 12, 2018, 12 pages.

Khurshid et al., "VeriFlow: Verifying Network-Wide Invariants in Real Time", 10th USENIX Symposium on Networked Systems Design and Implementation (NSDI '13), 2013, pp. 15-27.

International Preliminary Report on Patentability received for PCT Patent Application No. PCT/US2015/041547, dated Feb. 1, 2018, 10 pages.

Extended European Search Report and Search Opinion Received for EP Application No. 15899083.8, dated Mar. 6, 2019, 12 pages.

Christopher Monsanto et al: "Composing Software-Defined Networks", USENIX,, Apr. 11, 2013 (Apr. 11, 2013), pp. 1-13, XP061014326, [retrieved on Apr. 11, 2013].

Canini, M et al, "Software Transactional Networking: Concurrent and Consistent Policy Composition", Aug. 16, 2013, 6 Pgs.

Cisco Systems Inc., "Cisco Application Centric Infrastructure Fundamentals", Aug. 1, 2014, 3 Pgs.

International Searching Authority, The International Search Report and the Written Opinion, dated Sep. 8, 2016, PCT/US2015/041547, 13 Pgs.

Jeongkeun Lee et al., International Appl. No. PCT/US2015/030973 entitled Composition Constraints for Network Policies, dated May 15, 2015, 35 Pgs.

Jeongkeun Lee et al., International Appl. No. PCT/US2015/041546 entitled Providing a Composite Network Policy, dated Jul. 22, 2015, 40 Pgs.

Junggun Lee et al., International Appl. No. PCT/US2014/064394 entitled Network Policy Graphs filed Nov. 6, 2014 (43 pages).

Kim, H et al, "Simpler Network Configuration with State-based Network Policies", Oct. 1, 2013, 13 Pgs.

Shanbhag, S. et al, "Automated Composition of Data-path Functionality in the Future Internet", Nov./Dec. 2011, 7 Pgs.

Sravanthi, N.L.P.K. et al, "Applications of Graph Labeling in Major Areas of Computer Science", Aug. 2014, 5 Pgs.

* cited by examiner

ADDING METADATA ASSOCIATED WITH A COMPOSITE NETWORK POLICY

BACKGROUND

A network can be used to communicate data between various endpoints. The network can include interconnecting devices (e.g. routers, switches, etc.) for forwarding data along respective paths between endpoints. In addition, various service functions can be implemented with service function boxes deployed in the network, where the service functions can be applied on data packets communicated along paths in the network.

BRIEF DESCRIPTION OF THE DRAWINGS

Some implementations are described with respect to the following figures.

DETAILED DESCRIPTION

Figure 1:
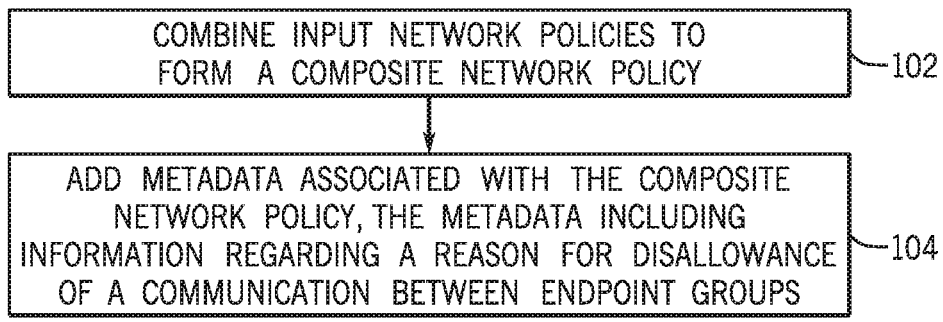
FIG. 1 is a flow diagram of an example process of combining network policies and adding metadata to be associated with a composite network policy, according to some implementations.

A network administrator may have to troubleshoot issues that may arise in a network. For example, a user may be unable to connect to a network resource (e.g. a server, an application, a database, etc.) in the network. In response to a query from the user, the network administrator may explain why (such as by identifying a network policy) the user is unable to connect to the server. Alternatively, the network administrator may have to diagnose a cause of the connectivity issue, and take actions to resolve the connectivity issue. In other cases, the network administrator may have to determine why a user is able to access a network resource, when a network policy may specify that such access of the network resource is disallowed.

In a large network, manually performing an analysis to resolve network connectivity issues or questions may be time consuming and may not produce accurate answers. The manual analysis may be even more challenging if there are a large number of network policies that govern communications in the network.

In accordance with some implementations of the present disclosure, techniques or mechanisms are provided to combine network policies into a composite network policy that can be used to govern communications in a network on a network-wide basis. Network policies can be provided for governing communications of data in a network. As used here, the term "network" can refer to an arrangement of devices and paths that allow for communications between endpoints. Examples of endpoints include a server, a virtual machine, a client device, a subnet, an end user, and so forth.

In some cases, in examples where there are multiple networks that are coupled to each other, a network can also be considered an endpoint. More generally, an endpoint can be a smallest unit of abstraction for which a network policy is applied.

A network policy can specify at least one characteristic of communications allowed between endpoint groups (EPGs), where each endpoint group (EPG) includes one or multiple endpoints. Examples of characteristics that can be specified by a network policy include port numbers to use for communications between respective EPGs, one or multiple service functions to apply to data that is communicated between respective EPGs, and/or other characteristics. A port number can refer to a Transmission Control Protocol (TCP) port number. Stated differently, a network policy can specify a behavior of a portion of a network in processing data (e.g. data packets). The processing of data packets can include forwarding data packets, modifying data packets (such as by changing values of headers of the data packets, dropping the data packets, etc.), applying service functions, and/or other types of processing.

Examples of service functions, which can be modeled as service function boxes, include load balancing to balance data communication load across multiple devices, protection services (such as firewall protection, intrusion detection, network authorization or authentication, etc.), network address translation (to translate an address of a data packet between a first address and a second address), and/or other service functions. A service function box can refer to a hardware device or a program (machine-readable or machine-executable instructions) configured to perform a respective service function.

In some example implementations, a service function box can represent an abstract function that takes a packet as input and returns a set of zero or more packets. In such implementations, a network programming language can be used to describe the function, behaviors, and properties of a service function box. In an example, a Pyretic network programming language can be used. Pyretic can use real IP/MAC addresses to implement network programs. Pyretic can be extended to write programs/policies regarding logical EPG parameters (e.g. 'web.ip' to indicate IP addresses of a Web EPG). Examples of functions that can be provided by Pyretic programs include a drop function (to drop packets), a forward function (to forward a packet), and so forth. In other examples, other network programming languages can be used.

Different network policies can be provided by respective different policy writers. Examples of policy writers can include network administrators, service providers, network operators, application developers, tenants of a cloud infrastructure, and so forth. A cloud infrastructure can refer to an arrangement of resources (including processing resources, storage resources, and/or other resources) that are available over a network to devices of tenants (which are users that are able to selectively access the cloud resources). Network policies can also be provided by automated entities, such as control programs, applications, network services, and so forth. Thus, a policy writer can refer to any entity (a human, a machine, or a program) that is able to provide a network policy.

In some examples, network policies can be provided by multiple different policy writers in the context of Software Defined Networking (SDN). SDN can refer to a technique for implementing computer networking environments using software (or more generally, machine-readable or machine-executable instructions) to control the configuration and allocation of networking resources in the network. In such a network, the hardware resources (e.g. routers, switches, server, etc.) or virtual network and compute resources (e.g. virtual layer 2/layer 3 (L2/L3) networks, virtual machines) can be programmed to allocate networking and computing resources according to the network policies of various policy writers.

Network policies can be expressed using any of various different programming languages. In some examples, as discussed in the present disclosure, network policies can be represented using graphs.

As the number of independent network policies provided by policy writers increase, the management of communications in a network can become more complex, due to possible conflicts between the network policies. Given a collection of network policies from respective policy writers, a composite network policy can be produced by merging the network policies. Such merging of the network policies is also referred to a composition of the network policies. Communications in a network can then be controlled using one or multiple controllers (e.g. one or multiple SDN controllers) according to the composite network policy.

Merging network policies can involve combining the network policies while accounting for any conflicts between the network policies. To properly merge multiple network policies into a composite network policy (a process referred to as network policy composition), an understanding of the intents of respective policy writers in formulating respective network policies is first determined. Manually merging network policies (particularly a large number of network policies) can be time and labor intensive, and may result in incorrect composition of the network policies or production of a composite network policy that is inconsistent with an intent of a policy writer.

In accordance with some implementations of the present disclosure, techniques or mechanisms are provided to allow for automated composition of network policies to form a composite network policy, while allowing for addition of metadata associated with the composite network policy to enable troubleshooting by network administrators should issues arise during operations of a network. As shown in FIG. 1, a process (which can be performed by a policy composer as discussed further below) combines (at 102) input network policies to form a composite network policy, where each input network policy of specifies at least one characteristic of communications allowed between EPGs, each EPG of the EPGs including at least one endpoint. When combining individual network policies, any conflicts between the individual network policies can be automatically resolved. In addition, according to some implementations, metadata can be added (at 104) that is associated with the composite network policy as part of the process of combining network policies. The metadata can be subsequently retrieved to resolve any issues or questions regarding communications in the network.

In some implementations, the metadata can include any or some combination of the following information:

Information regarding a reason for disallowance of a communication between endpoints of EPGs.

Information regarding a given input network policy governing communications allowed by the composite network policy between EPGs.

Information regarding a composition rule that led to inclusion or exclusion of a service function box for application to communications between EPGs.

Information regarding a reason for a specific ordering of service function boxes for application to communications between EPGs.

Information regarding a given EPG of one of the input network policies, the given EPG overlapping with an EPG of the composite network policy. EPGs overlap if they share a common endpoint.

Information regarding each communication flow of input network policies that overlaps with a communication flow of the composite network policy. Communication flows overlap if they share a common set of attributes. Examples of attributes of communication flows include source/destination addresses and/or ports of packets in the communication flow, a protocol used for packets in the communication flow, and so forth. Also, as discussed further below, a communication flow between EPGs can be represented as an edge between vertices representing the EPGs in a policy graph.

Information regarding an origin of a service function box, including the input network policy that includes the service function box.

In some implementations, a network policy can be represented as a policy graph. A policy graph (or more simply "graph") can include vertices that represent respective EPGs, and an edge between the vertices represent allowed communications between the EPGs (or more specifically, communication flows between endpoints of the EPGs). An EPG can refer to a group of arbitrary addressable endpoints or a group of endpoints that can perform a common logical role or share a common property (also referred to as a "label"). An EPG includes endpoints that satisfy a membership predicate specified for the EPG. A membership predicate can be provided as a label (any endpoint with a given label is a member of a given EPG). In general, a membership predicate can be provided as a Boolean expression over labels—for example, if a Boolean expression containing at least one given label of an endpoint evaluates to true, then the endpoint is a member of a respective EPG. In further examples, a Boolean expression can include multiple labels that are subject to a Boolean operator, such as AND, OR, and so forth. An example of a Boolean expression that can be associated with a given EPG is LABEL1 AND LABEL2 —if an endpoint has both LABEL1 and LABEL2, then the endpoint is a member of the given EPG.

Endpoints are addressable using Internet Protocol (IP) addresses, Media Access Control (MAC) addresses, virtual local area network (VLAN) identifiers, and/or other types of addresses.

Endpoint properties (labels) can be assigned and changed dynamically at runtime, to cause respective endpoints to change membership between different EPGs. In response to an endpoint changing membership from a first EPG to a second EPG, the network policy that can be applied on communications of the endpoint can change from a first network policy (associated with the first EPG) to a second network policy (associated with the second EPG). As a result, changing an endpoint property can cause different network policies to be dynamically assigned to an endpoint as the endpoint property changes over time.

Figure 2A:
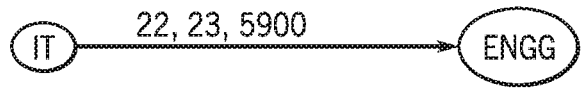
FIGS. 2A-2D are graphs representing corresponding different example network policies that can be provided to govern communications in a network, according to some examples.

FIGS. 2A-2D illustrate examples of policy graphs (or more simply "graphs") that are used to represent respective example network policies. FIG. 2A is a graph representing a first example network policy provided by an administrator for departments of an enterprise. The graph of FIG. 2A includes an IT vertex that represents an IT department (first EPG) and an ENGG vertex that represents an engineering department (second EPG). An edge between the IT vertex and the ENGG vertex indicates that traffic is allowed from any endpoint of the IT department to any endpoint of the engineering department using specified protocol port numbers (22, 23, or 5900 in the example of FIG. 2A).

Figure 2B:
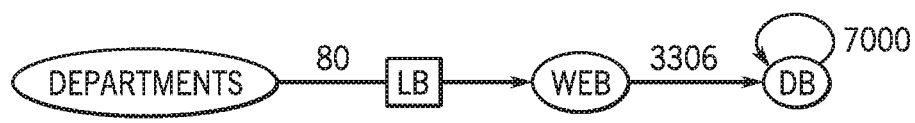

FIG. 2B is a graph representing a second example network policy provided by a web application administrator. The graph of FIG. 2B includes a Departments vertex (representing a first EPG including departments of an enterprise), a Web vertex (representing a second EPG including one or multiple Web applications), and a DB vertex (representing a third EPG including one or multiple databases). An edge between the Departments vertex and the Web vertex in the graph of FIG. 2B specifies that traffic is allowed from any department to access a Web application using port 80 in the example, and also specifies that the traffic is to be load balanced using a load balancer (LB) service function box. An edge between the Web vertex and the DB vertex specifies that traffic is allowed from a Web application to a database tier, using port 3306 in the example. The graph of FIG. 2B also shows an edge from the DB vertex to itself, which allows a database within the database tier to communicate with another database using port 7000 in the example.

Figure 2C:
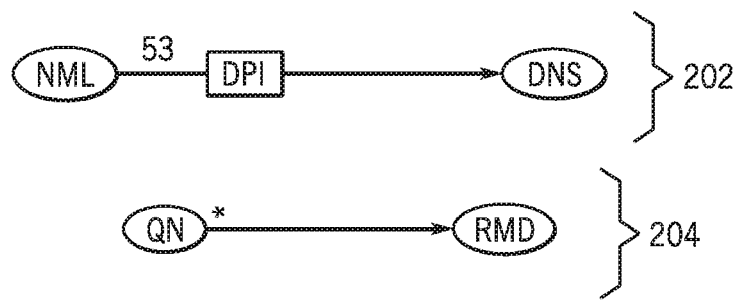

FIG. 2C is a graph representing a third example network policy provided by an SDN application for domain name system (DNS)-based security protection. The graph of FIG. 2C includes a first graph model 202 having an NML vertex (representing an EPG including endpoints having a "normal" security status) connected over an edge having a deep packet inspection (DPI) service function box to a DNS vertex (an EPG including one or multiple DNS servers). The first graph model 202 specifies that traffic from the NML EPG to the DNS EPG is allowed if the traffic uses port 53, and further specifies that DPI is to be applied on the traffic.

The graph of FIG. 2C further includes a second graph model 204 having a QN vertex (representing an EPG including endpoints that have a "quarantined" status) connected over an edge to an RMD vertex (representing an EPG that includes one or multiple security remediation servers). The "*" indication on the edge in the second graph model 204 indicates that the traffic from the QN EPG to the RMD EPG is allowed for any port number. The network policy represented by the graph of FIG. 2C specifies that DNS traffic from network endpoints with the "normal" security status is be inspected by a DPI service function box when DNS lookups of DNS server(s) are performed. The network policy represented by the graph of FIG. 2C also specifies that network endpoints that have the "quarantined" status can only send their traffic (of any type) to a security remediation server in the RMD EPG.

Figure 2D:
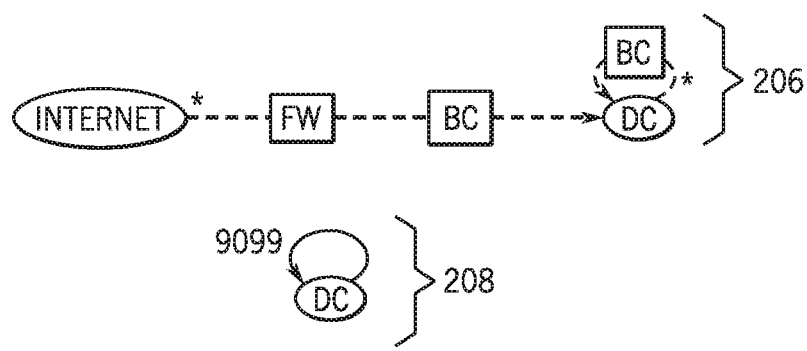

FIG. 2D is a graph representing a fourth example network policy provided by a data center administrator. The graph of FIG. 2D includes a first graph model 206 and a second graph model 208. The first graph model 206 specifies that traffic coming into a data center (represented by the DC vertex) from the Internet (represented by the Internet vertex) can use any port number (indicated by the "*") and is to pass through a firewall (FW) service function box (that provides firewall protection) and a byte counter (BC) service function box (that counts a number of bytes of data). In addition, the first graph model 206 includes an edge, including a byte counter (BC) service function box, from the DC vertex to itself, which specifies that traffic within the data center also traverses the BC service function box.

The second graph model 208 allows communication of traffic (on port 9099 in the example) between endpoints in the data center.

Although example policy graphs representing respective example network policies are depicted in FIGS. 2A-2D, it is noted that there can be other network policies represented by other policy graphs.

Each of the example network policies shown in FIGS. 2A-2D specify access control whitelisting (ACL), which grants specific entities access rights to other entities if a specified condition is satisfied. An edge of each policy graph in FIGS. 2A-2D can thus be referred to as an access control whitelisting edge, which provides an access control whitelisting rule. In addition, FIGS. 2B-2D represent network policies that specify service function chaining, in which one or multiple service functions are included in an edge to apply to data.

As noted further above, endpoints can be assigned labels dynamically at runtime, causing the endpoints to move from one EPG to another EPG. For example, a server that was assigned the label NML ("normal" status) can subsequently be relabeled QN ("quarantined" status) when a network monitor detects the server issuing a DNS query for a known malicious Internet domain.

Thus, a policy graph (such as any of those depicted in FIGS. 2A-2D) can represent a set of one or multiple network policies that are applied dynamically to each endpoint according to the endpoint's status changes over time. Moreover, note that the composition of network policies represented by graphs into a composite network policy is performed only in response to changes in network policies, such as when a network policy is added, modified, or removed. The composition of network policies does not have to be performed in response to a change in membership of an endpoint from one EPG to another EPG. Instead, a runtime system only has to perform a relatively lightweight operation of looking up and applying the respective network policies for each endpoint depending on the endpoint's current EPG membership.

Each of the graphs shown in FIGS. 2A-2D includes a directed edge that specifies allowed communication from any endpoint in a source EPG to any endpoint in a destination EPG. Each edge can be associated with a classifier, which matches packet header fields of a data packet to determine the respective network policy (e.g. an access control whitelisting rule) is to be applied. For example, in FIG. 2A, the classifier associated with the edge between the IT vertex and the ENGG vertex determines if values of the packet header fields of a packet indicate that a source of the packet is an endpoint in the IT department, a destination of the packet is an endpoint in the engineering department, and a port number of 22, 23, or 5900 is used. Stated differently, the classifier compares the values of the packet header fields (e.g. source address field, destination address field, port number field) of the packet to corresponding values (e.g. source address value, destination address value, port number value) of the respective network policy to determine if a match condition of the edge is satisfied. If the match condition of the edge is satisfied as determined by the classifier, then communication of the packet from the IT department endpoint to the engineering department endpoint is allowed.

Although FIGS. 2A-2D depict a single edge between respective pairs of EPG vertices, it is noted that there can be multiple directed edges from a first EPG vertex to a second EPG vertex, where each edge is associated with a respective different classifier.

In accordance with some implementations of the present disclosure, composition constraints can be specified in network policies, where the composition constraints capture respective intents of policy writers with respect to communications allowed by the corresponding network policies. A number of different composition constraints can be specified, and these composition constraints can be used in identifying and resolving conflicts between network policies when performing network policy composition. The composition constraints specified by network policies can govern what policy changes are allowed when the network policies are composed. In some implementations, composition constraints can be specified for any pair of EPGs in a network policy.

In some implementations of the present disclosure, the composition constraints can be represented using different types of edges in policy graphs that represent the corresponding network policies.

The composition constraints can include the following, according to some implementations of the present disclosure:

A composition constraint that specifies that communications between respective EPGs must be allowed.

A composition constraint specifying that communications between respective EPGs can be allowed.

A composition constraint specifying that communications between respective EPGs are to be blocked.

A composition constraint included in a first network policy and specifying at least one service function to be conditionally applied to communications between respective EPGs, if and only if another network policy specifies that the communications between the respective EPGs are allowed.

The policy composer is able to combine multiple independently specified policy graphs (representing respective network policies) into a coherent composed policy based on the composition constraints included in the policy graphs. It is noted that the policy composer is also able to also merge chains of service function boxes, as discussed further below.

Figure 3:
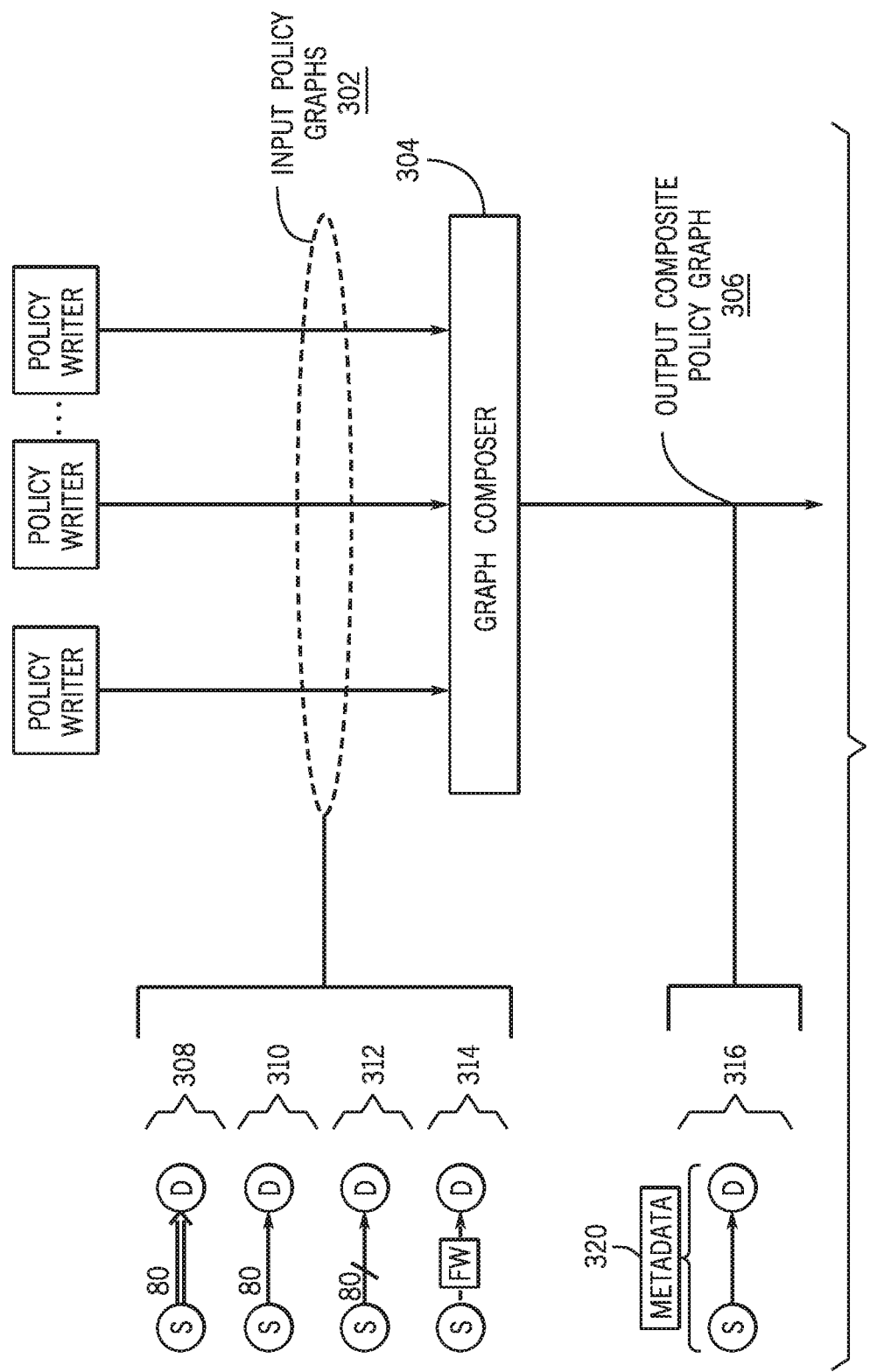
FIGS. 3 and 4A-4B are schematic diagrams of examples of composing a composite policy graph from input policy graphs, according to some examples.

FIG. 3 is a schematic diagram depicting composition of input policy graphs 302 (representing respective network policies) from respective policy writers by a graph composer 304 (which is an example of the policy composer discussed above) into a composite policy graph 306. The composition constraints that can be included in input policy graphs 302 governing communications between a particular source EPG (S) and a particular destination EPG (D) can be represented by respective different edge types 308, 310, 312, and 314.

The edge type 308 (including an arrow with double solid lines) represents a composition constraint that specifies that communications between the source EPG (S) and the destination EPG (D) must be allowed. The edge type 310 (including an arrow with single solid line) represents a composition constraint specifying that communications between the source EPG and the destination EPG can be allowed. The edge type 312 (including an arrow with a diagonal line crossing through the arrow) represents a composition constraint specifying that communications between the source EPG and the destination EPG are to be blocked. The edge type 314 (including a dotted arrow and having at least one service function box, e.g. FW box) represents a composition constraint included in a first network policy and specifying at least one service function to be conditionally applied to communications between the source EPG and the destination EPG, if and only if another network policy specifies that the communications between the source EPG and the destination EPG are allowed In some implementations, a must edge (edge type 308) or a can edge (edge type 310) overrides a conditional edge (edge type 314), while a block edge (edge type 312) overrides a can edge (edge type 310). The must edge or can edge of a first network policy overriding the conditional edge of a second network policy can refer to allowing the communications between the source EPG and the destination EPG, subject to application of the service function chain (including one or multiple service function boxes) of the conditional edge of the second network policy. The block edge overriding the can edge can refer to blocking communications between the source EPG and the destination EPG according to a first network policy, even though a second network policy allows the communications between the source EPG and the destination EPG.

A conflict between a must edge in a first network policy and a block edge in a second network policy is resolved based on ranks assigned to the first and second network policies or ranks assigned to the policy writers of the first and second network policies. For example, if the first network policy is ranked higher than the second network policy, the must edge of the first network policy overrides the block edge of the second network policy, such that communications between the source EPG and the destination EPG are allowed pursuant to the first network policy, even though the second network policy specifies that such communications are to be blocked. In the foregoing example, the second network policy is considered to be a dropped network policy, since the second network policy has been disregarded. A dropped network policy can be reported to a target entity, such as a policy writer or some other entity.

In such cases, if the ranks of the first and second network policies are the same, then the conflict between the first and second network policies remains unresolved. In such case, the unresolved conflict can be reported to a target entity, such as a policy writer or other entity for resolution, revision, and possible re-submission.

After composition of the input policy graphs 302 into the composite policy graph 306 that considers the composition constraints represented by the edge types 308, 310, 312, and 314, a resultant graph 316 (representing the composite network policy) for communications between the source EPG and the destination EPG is provided, which has an arrow with a single solid line to indicate that the communications between the source EPG and the destination EPG is allowed. Although not shown in FIG. 3, it is noted that the FW service function box of the edge type 314 can be added to the resultant graph 316 to indicate that the FW service function is to be applied in the composite policy graph 306.

As further shown in FIG. 3, metadata 320 can be added for association with the composite network policy represented by the resultant graph 316. The metadata 320 can include information as discussed above and also further below. Note that associating metadata with a composite policy can refer to associating the metadata with the overall composite policy, or with any or some combination of elements of the composite network policy, such as an EPG or an edge between EPGs.

In addition to specifying composition constraints as discussed above, service chain constraints can also be specified. In some implementations, there can be several different types of service chain constraints. A first type service chain constraint can set restrictions on the behavior of service function boxes that are added to a resultant service function chain produced from combining service function chains of multiple policy graphs. For example, a first type service chain constraint can set a restriction on packet header field modifications and packet drop operations that respective service function boxes can perform on packets. Composition analysis performed by the graph composer 304 can check whether adding a specific service function box to a given service chain would violate first type service chain constraints given by input policy graphs that are being composed together.

Table 1 below shows example first type service chain constraints for communications from a source EPG to a destination EPG.

TABLE 1

| | Service Function Box | |
|---|---|---|
| Match | Can drop packets | Can modify packets |
| Port 80 | N | DSCP = 16, 18, 20 |
| * | | |

The first type service chain constraints of Table 1 indicate that a service function box added to an edge from the source EPG to the destination EPG that uses port 80 edge cannot drop packets but is allowed to modify a differentiated services code point (DSCP) packet field to values in a specified set of specific values (e.g. 16, 18, 20 in Table 1). As an example, the edge from the source EPG to the destination EPG of a first input policy graph can include three service function boxes (boxes A, B, C) in sequence, which means that when the first input policy graph is combined with a second input policy graph, a service function box of the second input policy graph can be added to one of four positions in the edge from the source EPG to the destination EPG. The four positions include: (1) a position before box A, (2) a position between boxes A and B, (3) a position between boxes B and C, and (4) a position after box C. One or multiple first type service chain constraints are applicable to service function box(es) that can be added to one of the four possible positions.

Second type service chain constraints can specify restrictions on a change characteristic of a given service function box that is already present on the edge from the source EPG to the destination EPG. A change characteristic of a service function box indicates whether or not the service function box can be changed (e.g. dropped or modified) in a certain way. Examples of second type service chain constraints include (1) a service chain constraint specifying whether the given service function box can or cannot be dropped, and (2) a service chain constraint specifying whether the given service function box can or cannot be modified. If the second type service chain constraint specifies that the given service function box cannot be dropped, then the given service function box has to remain on (i.e. cannot be removed from) the edge from the source EPG to the destination EPG in the composite policy graph. Similarly, if the second type service chain constraint specifies that the given service function box cannot be modified, then the given service function box on the edge from the source EPG to the destination EPG cannot be changed.

Although just two types of service chain constraints are discussed, it is noted that there can be additional or alternative types of service chain constraints.

Figure 4A:
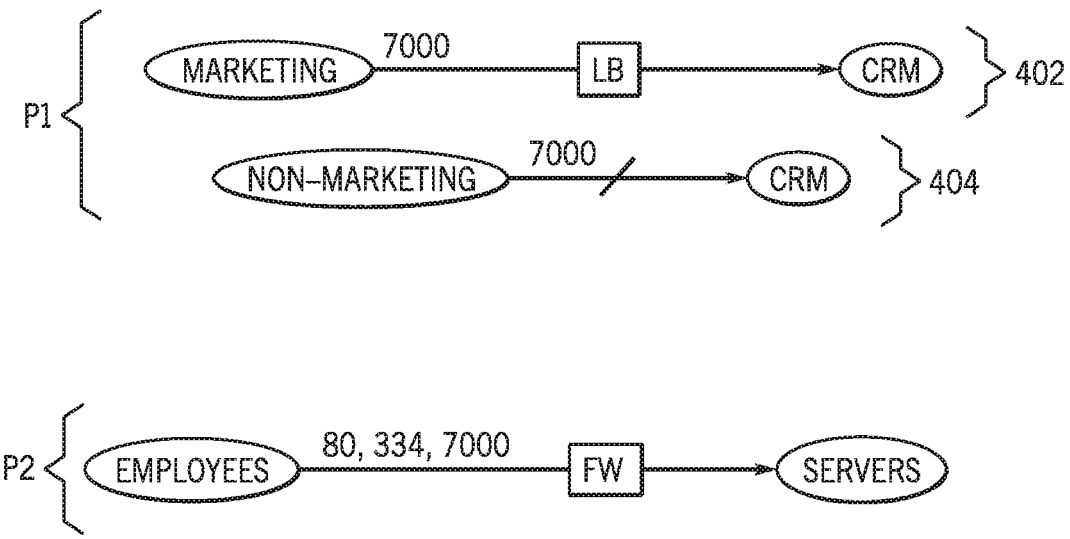

FIG. 4A depicts two example policy graphs P1 and P2 (representing respective network policies) that are to be combined by the graph composer 304. The policy graph P1 has a graph model 402 specifying that endpoints in a marketing EPG are allowed to access a customer relationship management (CRM) EPG (including one or multiple CRM servers). The edge between the marketing vertex and the CRM vertex specifies that port 7000 is to be used, and that a load balancing (LB) service function box is to be applied on the traffic between the marketing EPG and the CRM EPG.

The policy graph P1 also includes another graph model 404 including an edge according to the block edge type (edge type 312 in FIG. 3) between a non-marketing EPG and the CRM EPG. The block edge type specifies that traffic of endpoints in the non-marketing EPG (endpoints that are not in the marketing EPG) to the CRM EPG is blocked.

The policy graph P2 specifies that endpoints of an employees EPG can access endpoints of a servers EPG using ports 80, 334, and 7000, and that the traffic passes through a firewall (FW) service function. Note that endpoints of the marketing EPG are a subset of the employees EPG, and the endpoints of the CRM EPG are a subset of the servers EPG. Note also that the port range (port 7000) of the policy graph P1 is a subset of the port range (ports 80, 334, 7000) of the policy graph P2. As a result, the EPGs and port range of the policy graph P1 are completely encompassed by the EPGs and the port range in the policy graph P2

Since the EPGs and port range of the policy graph P1 are completely encompassed by the EPGs and the port range in the policy graph P2, one may naively compose the access control whitelisting rules of the policy graphs P1 and P2 by prioritizing P1 over P2, but this would incorrectly allow traffic of non-marketing EPG endpoints to reach endpoints of the CRM EPG. In addition, it can be assumed that the intended order of the service function chain is FW followed by LB, so that the graph composition would have to consider this intended order.

By using the graph model 404 in the policy graph P1, the intent of the policy writer of the policy graph P1 that traffic of endpoints of non-marketing employees to CRM servers are to be blocked can be captured and considered by the graph composer 304. Note that the access control whitelisting rules of the policy graphs P1 and P2 conflict since P1 blocks non-marketing employees' traffic to CRM servers, while P2 allows the traffic from all employees (including non-marketing employees) to all servers (including CRM servers). By including the composition constraint represented by the graph model 404 in the policy graph P1, the conflict can be resolved by overriding P2's policy to allow non-marketing employees to access CRM servers with the composition constraint in the policy graph P1 that blocks traffic of non-marketing employees to the CRM servers.

Figure 4B:
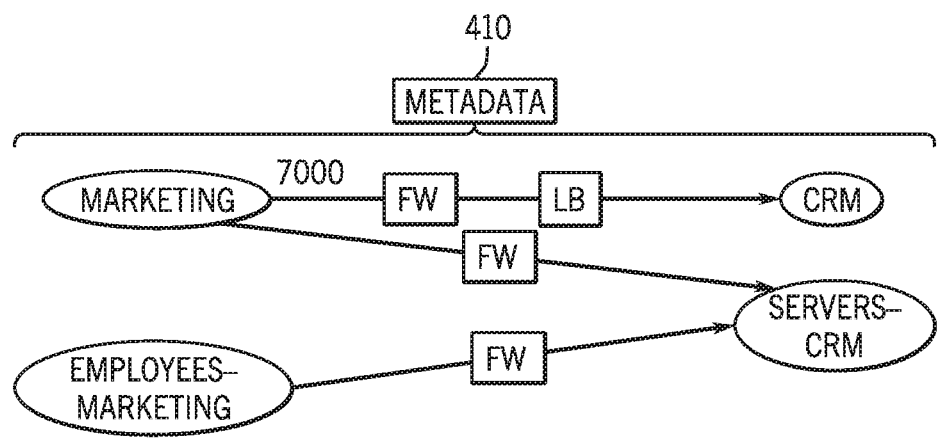

An example composite policy graph based on combining the policy graphs P1 and P2 is shown in FIG. 4B. In the composite policy graph of FIG. 4B, the {Employees—Marketing} vertex represents an EPG made up of non-marketing employees, and the {Servers—CRM} vertex represents an EPG made up of non-CRM servers. Also, in the composite policy graph of FIG. 4B, the order of the FW-LB chain between the marketing EPG and the CRM EPG complies with the intended order of the FW and LB service functions.

In combining the service function chain (including FW) of the policy graph P2 with the service function chain (including LB) of the policy graph P1, to provide FW-LB chain between the marketing EPG and the CRM EPG of the composite policy graph of FIG. 4B, the graph composer 304 can determine the proper order of the service function boxes by detecting dependencies between the service function boxes based on analysis of the boxes' packet processing functions. Detected dependencies are used to determine valid orderings.

Also, in forming the service function chain in the composite policy graph produced by the graph composer 304, the graph composer 304 also considers any service chain constraints as discussed above, wherein each service chain constraint can set restrictions on the behavior of service function boxes that are added in the composite policy graph.

As further shown in FIG. 4B, metadata 410 can be added for association with the composite network policy. The metadata 410 can include information as discussed above and also further below.

The added metadata (e.g. 320 in FIG. 3 or 410 in FIG. 4) that can be associated with the composite network policy allows for resolving issues or questions regarding communications in a network. Examples of questions that can be answered include:

1) Why is a communication flow (a flow of traffic) according to a specific description not reaching a target destination?
2) Why is a communication flow according to a specific description able to reach a target destination?
3) Why is a communication flow according to a specific description traversing a particular service function box, or a specific order of service function boxes?

A "description" of a communication flow can include a set of one or multiple attributes associated with the communication flow, including source/destination addresses and/or ports of packets in the communication flow, a protocol used for packets in the communication flow, and so forth.

To answer question 1), the metadata that can be added can include information regarding a reason for disallowance of a communication between endpoints of EPGs. This information can identify a composition constraint of a given input policy that caused traffic between EPGs to be blocked. Such a composition constraint is represented using edge type 312 shown in FIG. 3.

To answer question 2), the metadata that can be added can include information regarding a given input network policy governing communications allowed by the composite network policy between EPGs. The given input network policy can include a composition constraint that specifies that communications between specific EPGs are allowed. Such a composition constraint is represented using edge type 308 or 310 shown in FIG. 3.

To answer question 3), the metadata that can be added can include information regarding a composition rule that led to inclusion or exclusion of a service function box for application to communications between EPGs. The composition rule can include a composition constraint that specifies that a service function box or service function boxes is (are) to be applied to communications between EPGs (such as represented using edge type 314 in FIG. 3) or can include a service chain constraint (or service chain constraints) that may have led to inclusion or exclusion of a service function box. Thus, the information regarding a composition rule that can be included in metadata can identify a network policy (or network policies) that include(s) the respective composition constraint(s) or service chain constraint(s).

To answer question 3), the metadata that can be added can further include information regarding a reason for a specific ordering of service function boxes for application to communications between EPGs. For each pair of edges of network policies to be merged, if either edge has a service chain (of one or multiple service function boxes) for the intersecting subspace, then service function composition can be performed that combines service function boxes from the service chains of the edges. When combining service function boxes, the composition process provides a proper ordering of the service function boxes in the composed chain. In some examples, the proper order of the service function boxes can be determined by detecting dependencies between the service function boxes based on analysis of the boxes' packet processing functions. Detected dependencies are used to determine valid orderings.

Thus, the metadata can include information regarding dependencies between service function boxes that led to a specific order of the service function boxes.

In further examples, the concept of an atomic sub-chain can also be considered when combining service function boxes. An atomic sub-chain can be specified on the edge from a source EPG to a destination EPG. An atomic sub-chain includes at least two service function boxes, and does not allow for the insertion of another service function in the atomic sub-chain. The service function boxes of the atomic sub-chain can share a common second type constraint(s); in other words, the second type constraint(s) is (are) associated with the atomic sub-chain at the granularity of the atomic sub-chain, rather than individually with the service function boxes in the atomic sub-chain.

Thus, the metadata can include information regarding presence of an atomic sub-chain included in a given network policy.

In addition or in place of the foregoing information that can be included in the metadata, other information can include information that indicates an origin of each element (e.g. EPG or edge between EPGs or a service function box) of a composite network policy. For example, the metadata can include information regarding each EPG of input network policies that overlaps with an EPG of the composite network policy. EPGs overlap if they share a common endpoint.

The metadata can also include information regarding each edge of input network policies that overlaps with an edge of the composite network policy. Edges overlap if the edges carry communication flows sharing a common set of attributes.

The metadata can also include information regarding an origin of a service function box, including the input network policy that includes the service function box.

The metadata can also include information identifying an input network policy that was adopted, and constraints (e.g. composition constraints and/or service chain constraints) that caused the input network policy to be adopted. The metadata can also include information identifying an input network policy that was not adopted, and constraints (e.g. composition constraints and/or service chain constraints) that caused the input network policy to not be adopted.

Figure 5:
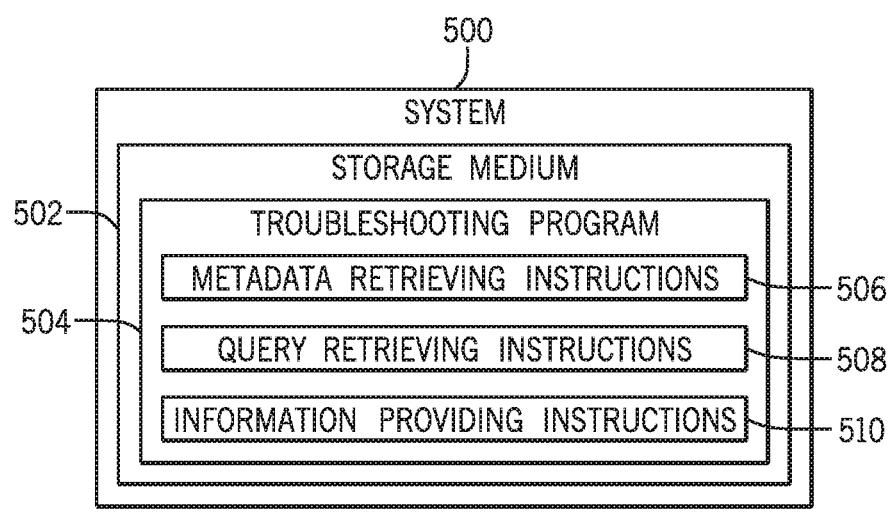
FIG. 5 is a block diagram of an example system that incorporates a troubleshooting program, according to some implementations.

FIG. 5 is a block diagram of a system 500 according to some implementations. The system 500 can include a computer or an arrangement of computers. The system 500 includes a non-transitory machine-readable or computer-readable storage medium (or storage media) 502. The storage medium (or storage media) 502 can store a troubleshooting program 504 that includes machine-readable instructions that are executable on one or multiple processors. The troubleshooting program 504 includes metadata retrieving instructions 506 that retrieves metadata associated with a composite network policy produced by combining input network policies, query receiving instructions 508 that receives a query regarding an issue in communications in a network governed by the composite network policy, and information providing instructions 510 that, in response to the query, provides information relating to the issue.

In some implementations, the troubleshooting program 504 can, in response to the information relating to the issue, modify an input network policy or a composition rule (composition constraint or service chain constraint) of an input network policy governing the combining of the input network policies. As another example, the troubleshooting program 504 can modify a conflict resolution decision previously made by a user or a system. There are certain conflicts between composition constraints in input network policies that a system cannot automatically resolve (such as a conflict between a must allow composition constraint and a block composition constraint discussed further above). In such cases, the system can use some heuristic (e.g. ranking discussed above) to pick a winning input network policy, or the system may ask a user to manually pick a winning input network policy. Modifying the "conflict resolution decision" as discussed above can refer to modifying the heuristic or the user decision.

Figure 6:
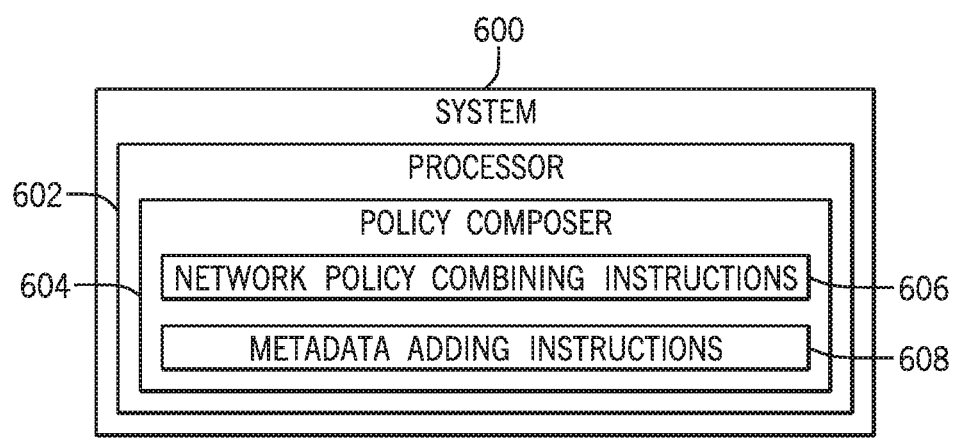
FIG. 6 is a block diagram of an example system that incorporates a policy composer, according to some implementations.

FIG. 6 is a block diagram of a system 600 according to some implementations. The system 600 can include a computer or an arrangement of multiple computers. The system 600 includes a processor (or multiple processors) 602, which can execute machine-readable instructions. A processor can include a microprocessor, a microcontroller, a physical processor module or subsystem, a programmable integrated circuit, a programmable gate array, or another physical control or computing device.

The processor(s) 602 can execute machine-readable instructions of a policy composer 604, which when executed perform various tasks as discussed above. The policy composer 604 includes network policy combining instructions 606 to form a composite network policy governing communications within a network. The policy composer 604 also includes metadata adding instructions 608 that add metadata for association with the composite network policy.

The storage medium (or storage media) 502 of FIG. 5 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
combining, by a system comprising a processor, input network policies to form a composite network policy, each input network policy of the input network policies specifying at least one characteristic of communications allowed between endpoint groups in a network;
adding, by the system, metadata associated with the composite network policy, the metadata including information regarding a reason for disallowance of one of the communications between endpoint groups;
receiving a query regarding an issue regarding the one of the communications;
in response to the query, determining, based on the metadata, a cause of the issue regarding the one of the communications; and
modifying the composite network policy in response to the determining.

2. The method of claim 1, wherein adding the metadata comprises adding information regarding a given input network policy of the input network policies, the given input network policy governing communications allowed by the composite network policy between endpoint groups.

3. The method of claim 1, wherein adding the metadata comprises adding information regarding a composition rule that led to inclusion of a service function box.

4. The method of claim 1, wherein adding the metadata comprises adding information regarding a reason for exclusion of a service function box.

5. The method of claim 1, wherein adding the metadata comprises adding information regarding a reason for a specific ordering of service function boxes.

6. The method of claim 1, wherein adding the metadata comprises adding information selected from among:
information regarding a given endpoint group of one of the input network policies, the given endpoint group overlapping with an endpoint group of the composite network policy,
information regarding each communication flow of the input network policies that overlaps with a communication flow of the composite network policy, and
information regarding an input network policy that includes a service function box of the composite network policy.

7. The method of claim 1, wherein the modifying is based on at least one selected from among modifying an input network policy of the input network policies, modifying a composition rule of an input network policy governing the combining of the input network policies, or modifying a conflict resolution decision previously made by a user or the system.

8. An article comprising at least one non-transitory machine-readable storage medium storing instructions that upon execution cause a system to:
retrieve metadata associated with a composite network policy produced by combining a plurality of input network policies, each input network policy of the input network policies specifying at least one characteristic of communications allowed between endpoint groups;
receive a query regarding an issue in one of the communications in a network governed by the composite network policy;
in response to the query, provide information relating to the issue, and determine, based on the metadata, a cause of the issue; and
modify the composite network policy in response to the determining.

9. The article of claim 8, wherein the retrieved metadata comprises information regarding why a communication between endpoint groups is disallowed.

10. The article of claim 8, wherein the retrieved metadata comprises information regarding a reason for exclusion of a service function box.

11. The article of claim 8, wherein the retrieved metadata comprises information regarding a reasons for a specific ordering of service function boxes.

12. A system comprising:
    at least one computer processor to:
        combine input network policies to form a composite network policy governing communications within a network, each input network policy of the input network policies specifying at least one characteristic of communications allowed between endpoint groups in the network, the combining being, according to a composition rule comprising a composition constraint included in the input network policies, the composition constraint selected from among a composition constraint specifying that communications between respective endpoint groups must be allowed, and a composition constraint specifying that communications between respective endpoint groups are to be blocked;
        add metadata for association with the composite network policy, the metadata including information regarding a reason for disallowance of one of the communications between endpoint groups;
        receive a query regarding an issue regarding the one of the communications;
        in response to the query, determine, based on the metadata, a cause of the issue regarding the one of the communications; and
        modify the composite network policy in response to the determining.

13. The system of claim 12, wherein the metadata further comprises information regarding a reason for exclusion of a service function box, or information regarding a reason for a specific ordering of service function boxes.

\* \* \* \* \*